Patented Dec. 22, 1942

2,305,748

UNITED STATES PATENT OFFICE 2,305,748

PROCESS OF MAKING DIALKYL STILBOESTROLS

László Vargha, Budapest, Hungary; vested in the Alien Property Custodian

No Drawing. Application May 1, 1939, Serial No. 271,160. In Hungary March 30, 1938

2 Claims. (Cl. 260—619)

This invention relates to a process of producing therapeutically valuable symmetrical diaryl-dialkyl-ethylene componds substituted in the aromatic ring by hydroxyl groups.

Dodds, Goldberg, Lawson, and Robinson discovered and described ("Nature," vol. 141, page 248) a stilbene-derivative: the 4,4'-dihydroxy-$\alpha$, $\beta$-diethyl-stilbene (I), showing a strong oestrogenic effect. In order to produce the compound (I) they converted the deoxyanisoin with sodium ethylate and ethyl iodide into $\alpha$-ethyl-deoxyanisoin and this, by the aid of ethyl-magnesium-bromide, into 3,4-dianisylhexan-3-ol. Splitting off water from this compound 4,4'-dimethoxy-$\alpha$, $\beta$-diethyl-stilbene was produced, and from this, by removing the methyl-groups, 4,4'-dihydroxy-$\alpha$, $\beta$-diethyl-stilbene (I) was obtained.

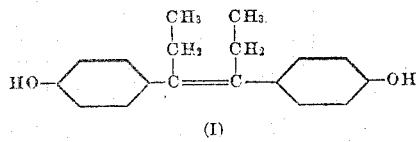

(I)

It has been found, however, that in practice the deoxyanisoin is a very unpleasant starting material and therefore I endeavoured to find a more suitable method for the production of the compound (I) and also of its homologues and derivatives. I succeeded in finding a method for the production of symmetrical diaryl-dialkyl-ethylene compounds having the following general Formula II:

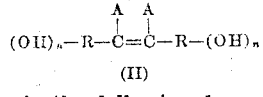

(II)

In this and in the following formulae A stands for an alkyl and R for an aryl radical, and $n$ indicates the number of the hydroxyl groups.

I started from mixed aliphatic-aromatic ketones according to the general Formula III these being very suitable for the Friedel-Crafts reaction.

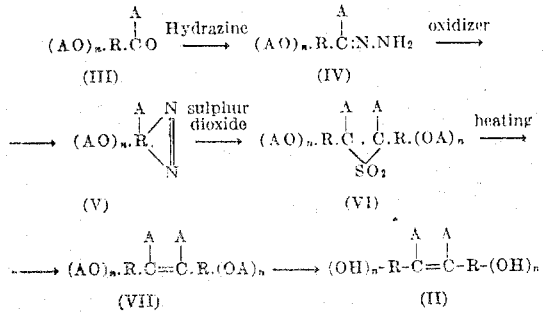

From the compounds (III) with hydrazine the corresponding hydrazones (IV) are obtained; by the use of oxidizing materials the hydrazones are converted into diazo-compounds (V) and these, by action of the sulphur dioxide, with liberation of nitrogen, into compounds of the new type: symmetrical diaryl - dialkyl - ethylene - sulfones (VI). By standing or by being heated, the ethylene-sulfones are converted, with liberation of sulphur dioxide, into the corresponding ethylene compounds (VII) and, if the alkyl radicals combined with the oxygen are removed by the usual methods, compounds are obtained according to the general Formula II.

If the method, generally described above, is to be applied to the production of the therapeutically valuable compound (I), we start from the p-methoxypropiophenone and remove the methyl radicals of the 4,4'-dimethoxy-$\alpha$, $\beta$-diethyl-stilbene obtained, by any known method, for instance, by treating the corresponding intermediate products with potassium hydroxide dissolved in ethyl alcohol.

By the process described, a particularly suitable material for the production of various symmetrical diaryl-dialkyl-compounds can be obtained in a simple and advantageous way.

EXAMPLE I

*P-methoxy-propiophenone-hydrazone*

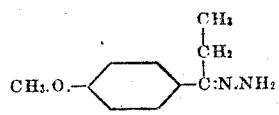

To a mixture of 164 grams of p-methoxy-propiophenone, of 328 grams of absolute ethyl alcohol and of 105 grams of hydrazine hydrate, in a glass vessel provided with a reflux condenser fitted with a calcium chloride tube, 164 grams of barium oxide reduced to pieces of the size of peas are added and the whole boiled on a water-bath for 5 hours. The barium hydroxide is filtered off at the pump, is twice washed with 50 ccms. of hot absolute ethanol and the solution is quickly poured, while stirring, into two litres of ice-water. The hydrazone separates immediately in crystalline form and, after standing for an hour, the crystals are filtered off at the pump, washed with water and quickly dried in a vacuum-desiccator over sulphuric acid and, if necessary, recrystallized from benzine. The pure hydrazone is a white material, the raw product is a slightly yellow one. It has a melting point of 73–76° C. The yield amounts to 140 grams, i. e., 78% of the theoretical quantity. By standing in wet condition, the hydrazone is converted rapidly into the yellow ketazine.

EXAMPLE II

*P-methoxy-phenyl-ethyl-diazomethane*

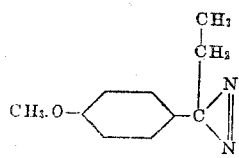

A suspension of 20 grams of p-methoxy-propiophenone-hydrazone in 120 ccms. of petrol-ether is shaken or vigorously stirred during 4 hours with 50 grams of mercuric oxide at 20° C. After 4 hours the dark red-lilac colored solution of the p-methoxy-phenyl-ethyl-diazo-methane obtained is filtered and used for further synthesis. It seems not to be advantageous to isolate this highly decomposible compound, even the solution of which in petrol-ether becomes decolorized with liberation of nitrogen and the di-p-methoxy-phenyl-diethyl-ketazine, a compound not yet described, separates from the liquid. This compound crystallizes out from hot benzine or ethanol in yellow needles having a melting point of 132° C.

EXAMPLE III

*4,4'-dihydroxy-α,β-diethyl-stilbene (I)*

A stream of sulphur dioxide is led into an ice-cooled fresh solution of p-methoxy-phenyl-ethyl-diazo-methane in petrol-ether. The solution becomes quickly decolorized with vigorous liberation of nitrogen, and a yellow crystalline mass consisting of a mixture of 1,1'-di-methoxy-phenyl - 1,1' - diethyl - ethylene-sulphone (VIII) and of the said di-p-methoxy-phenyl-diethyl-ketazine separates.

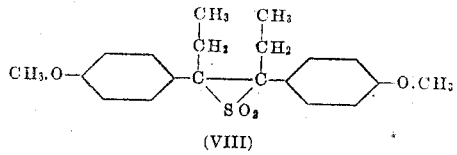

The two compounds cannot be separated because of the decomposibility of the sulphone. Even in the dessicator, the latter soon loses sulphur dioxide. The mixture of crystals obtained after the introduction of the sulphur dioxide and after filtration is slowly heated to 150° C. A vigorous liberation of sulphur dioxide begins and after this ceases, the melted mass crystallizes upon cooling.

The crystalline mass thus obtained is a mixture consisting of 4,4'-dimethoxy-α,β-diethyl-stilbene (IX) and of said ketazine.

$$CH_3.O-\phantom{x}-C=C-\phantom{x}-O.CH_3$$
(IX)

In order to split off the methyl groups 300 grams of the melted mass with a solution of 660 grams of potassium hydroxide in 1200 ccms. of ethanol are heated in an autoclave for 15–20 hours at 200–310° C. After being cooled, the reacted mass is dissolved in 2–3 litres of water and acidified with hydrochloric acid using Congo-red as an indicator. The oil separated is extracted with ether, the ether is distilled off and the residue is dissolved in 150 ccms. of hot methanol. While standing, the 4,4'-dihydroxy-α,β-diethyl-stilbene (I) crystallizes out. The crystals filtered off with suction are washed with 60% methanol and dried at 60–70° C. In order to obtain a further yield the filtrate is steam-distilled until clear drops are flowing over; thereafter, the residue is again crystallized from methanol. Finally, the united parts of the raw product are recrystallized from diluted ethanol or from benzol. The product shows a melting point of 171° C.

What I claim is:

1. Process of producing therapeutically valuable symmetrical diaryl-dialkyl-ethylene compounds substituted in the aromatic ring by hydroxyl-groups consisting in converting ethyl-alkoxy-phenyl ketones by the action of hydrazine into the corresponding hydrazones, converting these hydrazones by the use of oxidizing material into the corresponding diazo-compounds, converting the latter by the action of sulphur dioxide into the corresponding sulphones, and removing the SO₂-radical by heating to 150° C., and then removing the alkyl-radical combined with the oxygen.

2. A process of producing 4,4'-dihydroxy-α,β-diethyl-stilbene, comprising the steps of introducing a stream of sulphur dioxide into a solution of p-methoxy-phenyl-ethyl-diazomethane, filtering off the crystalline mass obtained, melting it at 150° C., heating the melted mass with a solution of potassium hydroxide in ethanol to 200–210° C. in an autoclave, dissolving the product in water, acidifying the solution, and purifying the product separated.

LÁSZLÓ VARGHA.